United States Patent [19]
Yanagisawa et al.

[11] 3,882,209
[45] May 6, 1975

[54] METHOD FOR EXTRUSION COATING ELECTRIC WIRES WITH A FOAMED POLYOLEFIN RESIN INVOLVING REDUCED DIE-PLATEOUT

[75] Inventors: Koji Yanagisawa; Hirokazu Kobayashi; Yukio Tayama, all of Chiba-ken, Japan

[73] Assignee: The Furukawa Electric Co., Ltd., Tokyo, Japan

[22] Filed: July 30, 1973

[21] Appl. No.: 383,719

[30] Foreign Application Priority Data
Aug. 3, 1972 Japan.............................. 47-77810
Aug. 3, 1972 Japan.............................. 47-77811
Aug. 3, 1972 Japan.............................. 47-77812
May 5, 1973 Japan.............................. 48-62516

[52] U.S. Cl. ........ 264/45.9; 260/2.5 E; 260/2.5 HA; 264/50; 264/53; 264/54; 264/174; 264/211; 264/DIG. 5; 264/DIG. 13
[51] Int. Cl. ............................................. B29d 27/09
[58] Field of Search ............ 264/51, 53, 54, DIG. 5, 264/DIG. 13, 211, 47, 174, 50; 260/2.5 R, 2.5 B, 2.5 E, 2.5 HA

[56] References Cited
UNITED STATES PATENTS

| | | | |
|---|---|---|---|
| 3,440,309 | 4/1969 | Breukihk et al. .................. | 264/54 X |
| 3,455,863 | 7/1969 | Williams ........................ | 264/211 X |
| 3,461,088 | 8/1969 | Stahnecker et al. ............... | 264/53 X |
| 3,523,916 | 8/1920 | Needham et al .................. | 264/54 X |
| 3,562,367 | 2/1971 | Shinohara et al ................ | 264/54 X |
| 3,600,309 | 8/1971 | Loser et al ..................... | 264/211 X |
| 3,644,230 | 2/1972 | Cronin .......................... | 264/53 X |
| 3,645,929 | 2/1972 | Normanton ...................... | 260/2.5 R X |
| 3,645,930 | 2/1972 | Normanton ...................... | 260/2.5 R X |
| 3,742,103 | 6/1973 | Spicuzza ........................ | 264/DIG. 5 |
| 3,755,208 | 8/1973 | Bhrenfreund .................... | 264/53 X |

FOREIGN PATENTS OR APPLICATIONS
1,044,502  10/1966  United Kingdom.................. 264/49

OTHER PUBLICATIONS
Lasman, Henry R., "Blowing Agents," (Reprinted from Encyclopedia of Polymer Science and Technology, Vol. 2, New York, John Wiley & Sons, 1965) pp. 547-550, 563.

Primary Examiner—Philip E. Anderson
Attorney, Agent, or Firm—Kemon, Palmer & Estabrook

[57] ABSTRACT

A method for manufacturing electric wires insulated with a foamed polyolefin-series resin by continuous, stable extrusion wherein a foamable polyolefin-series resin composition prepared by mixing a polyolefin-series resin with a foaming agent comprising azodicarbonamide and at least 10 per cent by weight of a material having a solubility parameter of 12.0 or more based on the amount of said azodicarbonamide is used for insulation of electric conductor.

16 Claims, No Drawings

METHOD FOR EXTRUSION COATING ELECTRIC WIRES WITH A FOAMED POLYOLEFIN RESIN INVOLVING REDUCED DIE-PLATEOUT

This invention relates to a method for manufacturing good quality electric wires insulated with a foamed polyolefin-series resin which enables the insulated electric wires to be manufactured continuously for scores of hours.

In the extrusion foaming of polyolefin-series resins, azodicarbonamide has hitherto been used widely as a foaming agent, for the reason that it has a thermal decomposition temperature of as high as 195° to 200°C, gives forth a small amount of calorific value, is highly dispersible in the resin, provides a good foamed mass with fine cells, evolves harmless gas when thermally decomposed, remains stable during storage or transit, and moreover is inexpensive.

But when a foamed polyolefin-series resin composition containing the above-mentioned azodicarbonamide is used for production of insulated wire with a covering of less than 1.0 mm in thickness, for telecommunication cable for example, there arises a remarkable variation of its finished diameter after several hours of continuous operation of insulating extruder as a result of abnormal rise in head pressure and sharp drop in the amount of extrusion. This makes it necessary to stop the operation of the extruder because further operation will raise the head pressure beyond its allowable limit, which will lead to damage of the extruder head.

The present inventors have earnestly studied the causes of such undesirable events and found that a residual product presumably originating with the thermal decomposition of azodicarbonamide used as a foaming agent gradually settled and firmly adhered on the inner walls of the die, crosshead and cylinder barrel of the extruder as well as on the surface of the screw, narrowing the passageway of fluid polyolefin-series resin, and in consequence giving rise to the above-mentioned difficulties.

To cope with the above-mentioned situation, therefore, negative measures are now taken, such as the stoppage of the extruder after its continuous operation for several hours to remove firmly adherent deposits on the various parts of the extruder. However, such countermeasures undesirably decrease the operating efficiency of the extruder.

The present inventors have made extensive studies to eliminate the above-mentioned difficulties occurring in insulating an electric conductor by extruding all around it a foamable polyolefin-series resin composition containing azodicarbonamide as a foaming agent. It has been thought that a residual product presumably resulting from the thermal decomposition of azodicarbonamide used as a foaming agent had a solubility parameter of as large as about 13 to 17 as against the solubility parameter of roughly less than 9.0 indicated by polyethylene, polypropylene and other polyolefinseries resins used as an insulation for electric conductors, and consequently the above-mentioned residual thermal decomposition product of azodicarbonamide evolved during extrusion from the polyolefin-series resin composition due to low compatibility with the polyolefin-series resin and deposited on the internal parts of the extruder. Based on this assumption, the present inventors have made further studies to suppress such occurrences. As the result, it has been discovered that if, in manufacturing electric wires insulated with a foamed polyolefin-series resin composition, the resin is mixed with a foaming agent, part or the whole of which consists of azodicarbonamide and also at least 10 per cent by weight of another material having a solubility parameter of 12.0 or more based on the amount of azodicarbonamide used, then all the above-mentioned problems will be resolved, enabling good quality electric wires insulated, particularly thinly insulated, with a foamed polyolefin-series resin composition to be manufactured continuously as long as scores of hours.

The reason why, in the method of this invention, said another material having a solubility parameter of 12.0 or more is added in the amount of at least 10 per cent by weight of the amount of azodicarbonamide used is that addition of less than 10 per cent by weight sometimes fails to attain a practical effect depending on the extruding conditions. However, excess application of above-mentioned another material is likely to obstruct the extrudability of the resultant composition or deteriorate the physical properties of an insulation of electric wires. Therefore, the upper limit to said application should preferably be set at a level of less than 150 per cent by weight based on the amount of azodicarbonamide used.

As used in this invention, the term "solubility parameter δ" is defined to mean a value, with respect to a liquid, determined by the following equation:

$$\delta = \left( \frac{\Delta H - RT^{1/2}}{V} \right)$$

where:
$\Delta H$ = latent heat of vaporization at temperature T°K
$R$ = gas constant ≈ 1.986
$V$ = molecular weight/density
$T$ = absolute temperature The solubility parameter of solids can be determined from their solubility in a liquid whose solubility parameter is already known.

As mentioned above, the method of this invention is characterized by mixing known foamable polyolefin-series resin composition with the material having a solubility parameter of more than 12.0. This material may concretely consist of a compound included in any of the following groups:

1. polyhydric alcohols having less than eight carbon atoms such as ethylene glycol, diethylene glycol, triethylene glycol, tetraethylene glycol, propylene glycol, dipropylene glycol, trimethylene glycol, butane diol, 1,5-pentane diol, hexylene glycol and glycerin;

2. ethanol amines having less than six carbon atoms such as monoethanol amine, diethanol amine and triethanol amine;

3. monohydric alcohols such as methyl alcohol and ethyl alcohol;

4. compounds containing a 1,3,5-triazine ring such as melamine and trihydrazinotriazine expressed by the general formula:

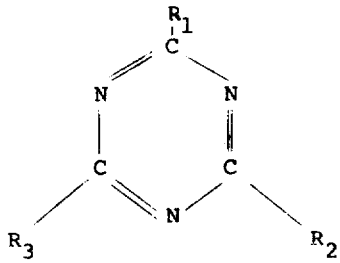

where:

$R_1$, $R_2$ and $R_3$ = nitrogen-bearing radicals having eight or less atoms such as —$NH_2$, —NHOH, —$NHNH_2$, —$NHCOCH_3$, —$CONH_2$, —$CSNH_2$, —$NHCONH_2$, —$NHCH_3$,

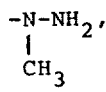

—$NHSO_3H$, —$SO_2NH_2$ and —NHCHO 5. cellulose derivatives such as carboxymethyl cellulose and methyl cellulose;
6. lignin and derivatives thereof such as lignin sulfonic acid;
7. compounds containing a lactone ring such as γ-butyrolactone
8. alkyl acetamides such as N-methyl acetamide
9. alkyl formamides such as N-methyl formamide
10. phenolic compounds such as phenol
11. ethylene carbonate, thiourea, succinimide, dimethyl sulfoxide, etc.

According to the method of this invention, one of the above-listed materials having a solubility parameter of 12.0 or more is generally used, but two or more thereof may be combined.

Polyolefin-series resins used in the method of this invention are defined to include olefinic homopolymers such as polyethylene and polypropylene, copolymers consisting of two or more kinds of olefins and copolymers consisting of olefins and vinyl monomers such as vinyl acetate and styrene.

Also in the present invention, the compounding of the material having a solubility parameter of 12.0 or more in the foamable polyolefin-series resin composition may be made by blending them homogeneously by a mixer or the like at the time of preparation of the said composition or by feeding them separately into the hopper of the extruder so that they are blended homogeneously in the course of extrusion or, in case the said material is in a liquid state, by pressurizing it into the vent of the extruder so that it is blended there with the said composition coming from the hopper.

Azodicarbonamide constituting the foaming agent in a foamable polyolefin-series resin composition used in the method of this invention may be partly substituted for by a thermally decomposable foaming agent which decomposes itself at the extruding temperature of the above-mentioned composition or a volatile liquid foaming agent which is changed into gas at said extruding temperature or any other gaseous substance.

These substituent foaming agents suitably consist of thermally decomposable foaming agents such as p-toluene sulfonyl semicarbazide, p,p'-oxybisbenzene sulfonyl hydrazide and dinitrosopentamethylene tetramine; volatile liquid foaming agents such as benzene, hexane, n-pentane, isopentane, petroleum ether and monofluorotrichloromethane; and gaseous substances such as propane, butane, dichlorodifluoromethane, nitrogen and carbon dioxide. A foaming agent system formed of a combination of particularly azodicarbonamide and p-toluene sulfonyl semicarbazide has the effect of causing the mass to present a good foamed structure when used as an insulation of electric wires.

Further for adjustment of the cell size of a foamed mass, the known nucleating agent may be mixed with a foamable polyolefin-series resin composition used in the method of this invention. It is also possible to mix said composition with other additives such as an age resister, pigment and filler as required.

As mentioned above, the method of this invention does not give rise to an abnormal increase in the head pressure of the extruder and a prominent change in the outer diameter of finished insulated electric wires originating from a sharp decline in the extruded amount of a foamable mass, as is the case with the prior art method, even though the extruder may be operated continuously for long hours, thereby enabling good quality electric wires insulated with a foamed polyolefinseries resin to be easily manufactured under a stable condition.

This invention will be more fully understood by reference to the following examples and controls. Another material having a solubility parameter of 12.0 or more used in the examples is hereinafter referred to as an autiplateous agent.

EXAMPLE 1

100 parts by weight of polyethylene having a density of 0.938 and a melt index (hereinafter abbreviated as "M.I.") of 0.3, 0.7 part by weight of azodicarbonamide, and 0.2 part by weight of thiourea having a solubility parameter of 20 were dry blended. A composition obtained was charged into the hopper of an insulation extruder wherein the cylinder had an inner diameter of 65 mm and the length L of the cylinder had a ratio of 22 to the inner diameter D thereof (hereinafter the ratio is abbreviated as L/D). The composition was extruded on an annealed copper wire 0.5 mm in diameter traveling at a speed of 700 m/min so as to finish an electric wire insulated with the foamed polyethylene with an outer diameter of 0.77 mm. Immediately after the commencement of extrusion, the extruder had a head pressure of 280 kg/cm² and the finished insulated electric wire had an outer diameter of 0.765 to 0.780 mm. During the 40-hour operation of the extruder, the head pressure and the thickness of an insulation indicated little change. Finally, the head pressure stood at 291 kg/cm², and the insulated electric wire had an outer diameter of 0.760 to 0.775 with the insulation layer expanded to a degree of 24 percent and indicated an electrostatic capacitance of 244 ± 5 PF/m, proving that the electric wire insulated with a foamed polyethylene prepared by the method of this invention was excellent in electric properties, outer diameter stability and surface appearance.

EXAMPLE 2

100 parts by weight of polypropylene having a density of 0.90 and M.I. of 3.0, 0.75 part by weight of azodicarbonamide and 0.25 part by weight of succinimide having a solubility parameter of 16.5 were dry blended. A composition obtained was charged into the hopper of the extruder wherein the cylinder had an inner diameter of 65 mm and L/D was 22. The composition was extruded on an annealed copper wire 0.65 mm in diameter traveling at a speed of 650 m/min so as to finish an electric wire insulated with a foamed polypropylene with an outer diameter of 0.97 mm. Immediately after the commencement of extrusion, the extruder had a head pressure of 318 kg/cm² and the insulated electric wire had an outer diameter of 0.964 to 0.979 mm. At the end of the 40-hour operation of the extruder, the head pressure stood at 335 kg/cm², and the insulated electric wire had an outer diameter of 0.962 to 0.980 mm with the insulation layer expanded at the rate of 15 percent, and indicated an electrostatic capacitance of 260 ± 5 PF/m, always providing a good quality electric wire insulated with a foamed polypropylene. Later, the extruder was stopped to observe the condition of the 5 parts of the extruder such as the die, crosshead, cylinder barrel and screw. It was found that the residual thermal decomposition product of azodicarbonamide was deposited only in an extremely small amount on said parts.

EXAMPLE 3

100 parts by weight of polyethylene having a density of 0.92 and M.I. of 0.3, 0.8 part by weight of azodicarbonamide and 0.2 part by weight of melamine were dry blended in a V-shaped blender. A composition obtained was charged into the hopper of the extruder wherein the cylinder had an inner diameter of 65 mm and L/D was 22. The composition was extruded on an annealed copper wire 0.5 mm in diameter traveling at a speed of 700 m/min so as to finish an electric wire insulated with a foamed polyethylene with an outer diameter of 0.8 mm and an electrostatic capacitance of 230 ± 6 PF/m, with the insulation layer expanded at the rate of 21 percent. Immediately after the initiation of extrusion, the extruder had a head pressure of 280 kg/cm$^2$ and the finished insulated electric wire had an outer diameter of 0.795 to 0.812 mm. At the end of the 48-hour operation of the extruder, the head pressure stood at 278 kg/cm$^2$ and the finished insulated electric wire had an outer diameter of 0.791 to 0.815 mm, showing that little change occurred in the head pressure and the outer diameter of the finished electric wire, permitting the stable continuous operation of the extruder. 50 hours after the commencement of extrusion, the extruder was stopped to clean the die, crosshead, cylinder barrel and screw. It was found that the residual thermal decomposition product of azodicarbonamide was little deposited on these parts of the extruder.

CONTROL 1

100 parts by weight of polyethylene having a density of 0.92 and M.I. of 0.3, and 0.8 part by weight of azodicarbonamide were dry blended in a V-shaped blender. A composition obtained was charged into the hopper of the same type of extruder as used in Example 3. The composition was extruded on an annealed copper wire 0.5 mm in diameter traveling at a speed of 700 m/min so as to finish an electric wire insulated with foamed polyethylene with an outer diameter of 0.8 mm and an electrostatic capacitance of 230 ± 6 PF/m, with the insulation layer expanded at the rate of 21 percent. Immediately after the initiation of extrusion, the extruder had a head pressure of 285 kg/cm$^2$ and the finished insulated electric wire had an outer diameter of 0.793 to 0.815 mm. 4 hours after the commencement of extrusion, however, the head pressure abnormally rose to 480 kg/cm$^2$ and the finished insulated electric wire presented an appreciable change of 0.765 to 0.827 mm in outer diameter. The extruder was stopped for cleaning in view of the unduly increased head pressure and the prominently varying outer diameter of the finished insulated electric wire. It was found that the grayish white residual thermal decomposition product of azodicarbonamide was deposited in a large amount on the parts parts of the extruder, such as the die, crosshead, cylinder barrel and screw.

EXAMPLE 4

100 parts by weight of polyethylene having a density of 0.945 and M.I. of 0.25, 0.75 part by weight of azodicarbonamide and 0.2 part by weight of 95 percent pure dealkalized lignin having a solubility parameter of 12.4 were dry blended in a V-shaped blender. A composition obtained was charged into the hopper of the extruder wherein the cylinder had an inner diameter of 65 mm and L/D was 22. The composition was extruded on an annealed copper wire 0.5 mm in diameter traveling at a speed of 700 m/min so as to finish an electric wire insulated with a foamed polyethylene with an outer diameter of 0.8 mm and an electrostatic capacitance of 230 ± 6 PF/m, with the insulation layer expanded at the rate of 21 percent. Immediately after the initiation of extrusion, the extruder had a head pressure of 275 kg/cm$^2$ and the finished insulated electric wire had an outer diameter of 0.796 to 0.815 mm. 24 hours after the commencement of extrusion, the head pressure stood at 278 kg/cm$^2$ and the finished insulated electric wire had an outer diameter of 0.797 to 0.816 mm. Thus a good quality electric wire insulated with foamed polyethylene was obtained with little change in the head pressure and the outer diameter of the finished insulated electric wire. 25 hours after the start of extrusion, the extruder was stopped for cleaning. It was found that the residual thermal decomposition product of the foaming agent did not substantially settle on the parts of the extruder, such as the die, crosshead, cylinder barrel and screw.

CONTROL 2

100 parts by weight of polyethylene having a density of 0.945 and M.I. of 0.25 and 0.75 part by weight of azodicarbonamide were dry blended in a V-shaped blender. A composition thus prepared was charged into the hopper of the same type of extruder as used in Example 4. The composition was extruded on an annealed copper wire 0.5 mm in diameter traveling at a speed of 700 m/min so as to finish an electric wire insulated with foamed polyethylene with outer diameter of 0.8 mm and an electrostatic capacitance of 230 ± 6 PF/m, with the insulation layer expanded at the rate of 21 percent. Immediately after the commencement of extrusion, the extruder had a head pressure of 280 kg/cm$^2$ and the finished insulated electric wire had an outer diameter of 0.793 to 0.817 mm. 6 hours after the initiation of extrusion, however, the head pressure unduly rose to 460 kg/cm$^2$ and the finished insulated electric wire varied from 0.765 to 0.803 mm in outer diameter. The extruder was stopped for cleaning in view of the prominently increased head pressure and the noticeably varying outer diameter of the finished insulated electric wire. It was found that the grayish white residual thermal decomposition product of azodicarbonamide was deposited in a large amount on the parts of the extruder, such as the die, crosshead, cylinder barrel and screw.

EXAMPLE 5

A basic composition was prepared by adding 0.7 part be weight of finely divided azodicarbonamide powder to 100 parts by weight of low density polyethylene having a density of 0.919 and M.I. of 0.3. The basic composition was dry blended in a V-shaped blender with various kinds of antiplateout agents shown in Table 1 below to prepare foamable polyethylene compositions. Each foamable polyethylene composition was separately charged into the hopper of the extruder wherein the cylinder had an inner diameter of 65 mm and L/D was 22. The foamable polyethylene composition was extruded on an annealed copper wire 0.9 mm in diameter traveling at a speed of 600 m/min so as to finish electric wires insulated with foamed polyethylene with an outer diameter of 1.40 mm and an electrostatic capacity of 230 ± 6 PF/m, with the insulation layer expanded at the rate of 28 percent. Determination was made of changes in the head pressure of the extruder and the outer diameter of the finished electric wires insulated with the various foamed polyethylene, the results being also presented in Table 1 below.

EXAMPLE 6

A basic composition was prepared by adding 0.7 part by weight of azodicarbonamide to 100 parts by weight of polyethylene having a density of 0.92 and M.I. of 0.3. The basic composition and various kinds of antiplateout agents shown in Table 2 below were dry blended in a V-shaped blender to prepare foamable polyethylene compositions. Each foamable polyethylene composition was separately charged into the hopper of the extruder wherein the cylinder had an inner diameter of 65 mm and L/D was 20. The foamable polyethylene composition was extruded on an annealed copper wire 0.5 mm in diameter traveling at a speed of 700 m/min so as to finish electric wires insulated with Table 1

| Antiplate-out agent | Solubility parameter | Amount added (part by weight) | Proportion based on ADCA* (%) | Head pressure (kg/cm²) when extrusion started | Head pressure (kg/cm²) when extrusion ended | Outer diameter of finished insulated electric wire (mm) when extrusion started | Outer diameter of finished insulated electric wire (mm) when extrusion ended | Period of continuous operation (hrs) |
|---|---|---|---|---|---|---|---|---|
| Ethylene glycol | 14.2 | 0.2 | 28.5 | 238 | 245 | 1.395 to 1.410 | 1.388 to 1.410 | 24.0 |
| Glycerin | 16.5 | 0.2 | 28.5 | 238 | 265 | 1.391 to 1.406 | 1.394 to 1.412 | 24.0 |
| 1,3-butanediol | 14.1 | 0.2 | 28.5 | 247 | 266 | 1.390 to 1.413 | 1.396 to 1.410 | 24.0 |
| Propylene glycol | 14.8 | 0.2 | 28.5 | 249 | 259 | 1.388 to 1.419 | 1.388 to 1.405 | 24.0 |
| Propyl alcohol | 12.0 | 0.2 | 28.5 | 254 | 257 | 1.386 to 1.403 | 1.394 to 1.415 | 24.0 |
| Ethyl alcohol | 12.7 | 0.2 | 28.5 | 241 | 260 | 1.399 to 1.418 | 1.396 to 1.418 | 24.0 |
| Methyl alcohol | 14.5 | 0.2 | 28.5 | 255 | 275 | 1.394 to 1.411 | 1.393 to 1.420 | 24.0 |
| Monoethanol amine | 15.5 | 0.2 | 28.5 | 242 | 251 | 1.384 to 1.412 | 1.388 to 1.412 | 24.0 |
| N-butanol | 11.3 | 0.2 | 28.5 | 239 | 390 | 1.396 to 1.414 | 1.370 to 1.410 | 10.0 |
| Cyclohexanol | 10.9 | 0.2 | 28.5 | 249 | 400 | 1.380 to 1.413 | 1.372 to 1.420 | 10.0 |
| Not added | — | — | — | 250 | 410 | 1.390 to 1.410 | 1.300 to 1.401 | 8.0 |

*ADCA is an abbreviation of azodicarbonamide.

As apparent from Table 1 above, addition of the abovelisted alcohols and ethanol amines having a solubility parameter of 12.0 or more as antiplateous agents enabled good quality electric wires insulated with foamed polyethylene to be manufactured continuously for long hours under a stable condition with little change in the finished outer diameter.

foamed polyethylene with an outer diameter of 0.8 mm and an electrostatic capacitance of 230 ± 6 PF/m, with the insulation layer expanded at the rate of 21 percent. Determination was made of changes with time in the head pressure of the extruder and the diameter of the respective finished insulated electric wires, the results being also set forth in Table 2 below.

Table 2

| Antiplate-out agent | Solubility parameter | Amount added (part by weight) | Proportion based on ADCA* | Head pressure (kg/cm²) when extrusion started | Head pressure (kg/cm²) when extrusion ended | Outer diameter of finished insulated electric wire (mm) when extrusion started | Outer diameter of finished insulated electric wire (mm) when extrusion ended | Period of continuous operation (hrs) |
|---|---|---|---|---|---|---|---|---|
| Methyl cellulose | 15.0 | 0.2 | 28.6 | 255 | 257 | 0.794 to 0.818 | 0.790 to 0.816 | 48.0 |

Table 2 – Continued

| Antiplate-out agent | Solubility parameter | Amount added (part by weight) | Proportion based on ADCA* | Head pressure (kg/cm²) | | Outer diameter of finished insulated electric wire (mm) | | Period of continuous operation (hrs) |
|---|---|---|---|---|---|---|---|---|
| | | | | when extrusion started | when extrusion ended | when extrusion started | when extrusion ended | |
| Carboxymethyl cellulose | 14.0 | 0.15 | 21.4 | 231 | 235 | 0.793 to 0.813 | 0.785 to 0.815 | 48.0 |
| α-lignin sulfonic acid | 15.0 | 0.2 | 28.6 | 280 | 297 | 0.787 to 0.817 | 0.792 to 0.815 | 48.0 |
| Trihydrazino triazine | 18.5 | 0.2 | 14.3 | 274 | 291 | 0.785 to 0.805 | 0.788 to 0.809 | 48.0 |
| 2,4,6-tris (methylamino)-1,3,5-triazine | 13.0 | 0.3 | 42.9 | 232 | 287 | 0.794 to 0.812 | 0.785 to 0.807 | 48.0 |
| Succinimide | 16.5 | 0.25 | 35.7 | 255 | 269 | 0.781 to 0.811 | 0.788 to 0.805 | 48.0 |
| Not added | — | — | — | 274 | 505 | 0.795 to 0.817 | 0.745 to 0.793 | 4.5 |
| Dibutyl phthalate | 9.3 | 0.2 | 28.6 | 250 | 455 | 0.798 to 0.810 | 0.743 to 0.800 | 6.0 |
| Xylene | 8.8 | 0.2 | 28.6 | 253 | 460 | 0.797 to 0.807 | 0.741 to 0.803 | 6.0 |

*ADCA is an abbreviation of azodicarbonamide.

As apparent from Table 2 above, omission of an antiplate-out agent caused the head pressure of the extruder to be abnormally increased to more than 500 kg/cm² at the end of the 4.5-hour continuous operation of the extruder and gave rise to a noticeable change of 5/100 mm in the outer diameter of the finished insulated electric wires. The addition of the agent having a solubility parameter of less than 12.0 enabled the continuous operation of the extruder to be extended, slightly, but not to any substantial extent.

In contrast, any basic composition containing an antiplateout agent having a solubility parameter of 12.0 or more raised no problem with the head pressure of the extruder even when it was operated continuously for 48 hours and the finished insulated electric wire indicated little change in the outer diameter, thus providing a good quality electric wire insulated with foamed polyethylene.

Observation was made of the inner walls of the die, crosshead and cylinder barrel and the surface of the screw of the extruder after its stoppage. When a basic composition was mixed with an antiplateout agent having a solubility parameter of 12.0 or more, it was substantially impossible to recognize the deposition of any residual product presumably resulting from the thermal decomposition of azodicarbonamide. In contrast, when a basic composition was used without an increased extrusion pressure-mitigating agent, a grayish white substance which was supposed to be a residual product derived from the thermal decomposition of azodicarbonamide was found settling in a large amount on the above-mentioned parts of the extruder.

EXAMPLE 7

A basic composition was prepared by adding 0.65 part by weight of azodicarbonamide to 100 parts by weight of polyethylene having a density of 0.945 and M.I. of 0.35. The basic composition was mixed with various kinds of antiplateout agents shown in Table 3 below to prepare foamable polyethylene compositions. Each foamable polyethylene composition was charged into the hopper of the extruder wherein the cylinder had an inner diameter of 65 mm and L/D was 22. The foamable polyethylene composition was extruded on an annealed copper wire 0.9 mm in diameter traveling at a speed of 600 m/min so as to finish electric wires insulated with foamed polyethylene with an outer diameter of 1.34 mm and an electrostatic capacity of 250 ± 6 PF/m, with the insulation layer expanded at the rate of 30 percent. Determination was made of changes with time in the head pressure and the outer diameter of the respective finished electric wires insulated with foamed polyethylene after the extruder was operated continuously for long hours, the results being also presented in Table 3 below.

Table 3

| Antiplate-out agent | Solubility parameter | Amount added (part by weight) | Proportion based on ADCA* (%) | Head pressure (kg/cm²) | | Outer diameter of finished insulated electric wire (mm) | | Period of continuous operation (hrs) |
|---|---|---|---|---|---|---|---|---|
| | | | | when extrusion started | when extrusion ended | when extrusion started | when extrusion ended | |
| Pine oil | 8.6 | 0.4 | 61.5 | 294 | 421 | 1.332 to 1.349 | 1.304 to 1.383 | 4.0 |

Table 3—Continued

| Antiplate-out agent | Solubility parameter | Amount added (part by weight) | Proportion based on ADCA* (%) | Head pressure (kg/cm²) when extrusion started | Head pressure (kg/cm²) when extrusion ended | Outer diameter of finished insulated electric wire (mm) when extrusion started | Outer diameter of finished insulated electric wire (mm) when extrusion ended | Period of continuous operation (hrs) |
|---|---|---|---|---|---|---|---|---|
| γ-butyrolactone | 12.8 | 0.3 | 46.2 | 303 | 349 | 1.335 to 1.350 | 1.336 to 1.352 | 40.0 |
| N-methyl acetamide | 14.6 | 0.2 | 30.8 | 307 | 295 | 1.333 to 1.346 | 1.332 to 1.350 | 40.0 |
| Phenol | 14.5 | 0.2 | 30.8 | 318 | 327 | 1.337 to 1.355 | 1.339 to 1.357 | 40.0 |
| N-methyl formamide | 16.1 | 0.2 | 30.8 | 295 | 304 | 1.339 to 1.353 | 1.335 to 1.350 | 40.0 |
| Ethylene carbonate | 15.1 | 0.1 | 15.4 | 300 | 315 | 1.337 to 1.351 | 1.335 to 1.347 | 40.0 |
| Dimethyl sulfoxide | 12.9 | 0.2 | 30.8 | 314 | 341 | 1.329 to 1.346 | 1.328 to 1.349 | 40.0 |
| N,N'-dimethyl formamide | 12.1 | 0.3 | 46.2 | 297 | 368 | 1.332 to 1.345 | 1.326 to 1.345 | 40.0 |
| Not added | — | — | — | 306 | 449 | 1.330 to 1.342 | 1.289 to 1.353 | 2.8 |

As apparent from Table 3 above, an antiplateout agent having a solubility parameter of around 15.0 displayed the most prominent effect.

EXAMPLE 8

100 parts by weight of polypropylene having a density of 0.90 and M.I. of 3.0, 1.0 part by weight of azodicarbonamide and 0.15 part by weight of sodium salt of carboxymethylcellulose were dry blended in a V-shaped blender. A composition thus blended was charged into the hopper of the extruder wherein the cylinder had an inner diameter of 65 mm and L/D was 20. The blended mass was extruded on an annealed copper electric wire 0.65 mm in diameter traveling at a speed of 600 m/min so as to finish an electric wire insulated with a foamed polypropylene with an outer diameter of 1.2 mm and an electrostatic capacitance of 170 ± 5 PF/m, with the insulation layer expanded at the rate of 15 percent. Immediately after the commencement of extrusion, the extruder had a head pressure of 352 kg/cm² and the insulated electric wire had an outer diameter of 1.18 to 1.21 mm. Even 48 hours after the initiation of extrusion, the head pressure stood at 357 kg/cm² and the insulated electric wire had an outer diameter of 1.19 to 1.22 mm, proving that extrusion was carried out continuously for long hours under a stable condition with little change in the head pressure and the outer diameter of the finished insulated electric wire. 50 hours after the start of extrusion, the extruder was stopped for cleaning. It was found that there was little residual thermal decomposition product of azodicarbonamide deposited on the parts of the extruder such as the die, crosshead, cylinder barrel and screw.

EXAMPLE 9

100 parts by weight of polypropylene having a density of 0.90 and M.I. of 3.0, 1.0 part by weight of azodicarbonamide and 0.1 part by weight of trihydrazinotriazine as a compound containing a 1,3,5-triazine ring were dry blended in a V-shaped blender. A composition thus blended was charged into the hopper of the extruder in which the cylinder had an inner diameter of 65 mm and L/D was 20. The blended mass was extruded on an annealed copper wire 0.9 mm in diameter traveling at a speed of 600 m/min so as to finish an electric wire insulated with a foamed polypropylene with an outer diameter of 2.2 mm and an electrostatic capacitance of 120 ± 3 PF/m, with the insulation layer expanded at the rate of 15 percent. Immediately after the commencement for extrusion, the extruder had a head pressure of 350 kg/cm² and the finished insulated electric wire had an outer diameter of 2.18 to 2.22 mm. 48 hours after the start of extrusion, the head pressure stood at 355 kg/cm² and the finished insulated electric wire had an outer diameter of 2.17 to 2.21 mm, providing a good quality electric wire insulated with foamed polypropylene without any noticeable change in the head pressure and the outer diameter of the finished insulated electric wire. 50 hours after the commencement of extrusion, the extruder was stopped for cleaning. It was found that there was no residual thermal decomposition product of azodicarbonamide settling on the parts of the extruder such as the die, crosshead, cylinder barrel and screw.

EXAMPLE 10

100 parts by weight of polypropylene having a density of 0.90 and M.I. of 3.0, 1.0 part by weight of azodicarbonamide and 0.1 part by weight of α-lignin sulfonic acid were dry blended in a V-shaped blender. A composition thus blended was charged into the hopper of the extruder in which the cylinder had an inner diameter of 65 mm and L/D was 20. The blended mass was extruded on an annealed copper wire 0.9 mm in diameter traveling at a speed of 600 m/min so as to finish an electric wire insulated with foamed polypropylene with an outer diameter of 2.2 mm and an electrostatic capacitance of 120 ± 3 PF/m, with the insulation layer expanded at the rate of 15 percent. Immediately after the commencement of extrusion, the extruder had a head pressure of 354 kg/cm² and the finished insulated electric wire had an outer diameter of 2.18 to 2.21 mm. 24 hours after the initiation of extrusion, the head pressure stood at 370 kg/cm² and the finished insulated electric wire had an outer diameter of 2.17 to 2.21 mm, producing good quality electric wire insulated with foamed polypropylene without any considerable change in the head pressure and the outer diameter of the finished insulated electric wire. 25 hours after the start of extrusion, the extruder was stopped for cleaning. It was found that there was little residual thermal decomposition product of azodicarbonamide deposited on the parts of the extruder such as the die, crosshead, cylinder barrel and screw.

CONTROL 3

100 parts by weight of polypropylene having a density of 0.90 and M.I. of 3.0 and 1.0 part by weight of azodicarbonamide were dry-blended in a V-shaped blender. A composition obtained was charged into the hopper of the same type of extruder as used in Example 10. The blended mass was extruded on an annealed copper wire 0.9 mm in diameter so as to finish an electric wire insulated with a foamed polypropylene with an outer diameter of 2.2 mm and an electrostatic capacitance of 120 ± 3 PF/m, with the insulation layer expanded at the rate of 15 percent. Immediately after the commencement of extrusion, the extruder had a head pressure of 360 kg/cm² and the finished electric wire had an outer diameter of 2.17 to 2.21 mm. 5 hours after the start of extrusion, however, the head pressure excessively rose to 520 kg/cm² and the finished insulated electric wire presented as wide a variation as from 2.05 to 2.18 mm. When the extruder was stopped for cleaning, it was found that a grayish white residual thermal decomposition product of azodicarbonamide was deposited on the parts of the extruder such as the die, crosshead, cylinder barrel and screw.

EXAMPLE 11

100 parts by weight of polypropylene having a density of 0.90 and M.I. of 3.0, 0.4 part by weight of azodicarbonamide and each of the additional thermally decomposable foaming agents shown in Table 4 below were blended. The compositions obtained were mixed with 0.2 part by weight of N-ethyl acetamide having a solubility parameter of 12.3, which acted as an antiplateout agent. The foamable polypropylene resin compositions thus prepared were separately charged into the hopper of the extruder in which the cylinder had an inner diameter of 65 mm and L/D was 20. The resin compositions obtained were each extruded on an annealed copper wire 0.65 mm in diameter traveling at a speed of 650 m/min so as to finish electric wires insulated with foamed polypropylene with an outer diameter of 0.97 mm (insulation layer 0.16 mm thick) and an electrostatic capacitance of 250 ± 6 PF/m, with the insulation layer expanded at the rate of 15 percent. The extruder was operated continuously for long hours to produce electric wires insulated with various kinds of foamed polypropylene. Determination was made of changes with time in the head pressure and the outer diameter of electric wires insulated with said foamed polypropylene, the results being presented in Table 4 below.

Table 4

| Foaming agent used with ADCA* | Amount added (part by weight) | N-ethyl acetamide added or not | N-ethyl acetamide proportion based on ADCA* (%) | Head pressure (kg/cm²) when extrusion started | Head pressure (kg/cm²) when extrusion ended | Outer diameter of finished insulated electric wire (mm) when extrusion started | Outer diameter of finished insulated electric wire (mm) when extrusion ended | Period of continuous operation (hrs) |
|---|---|---|---|---|---|---|---|---|
| P-toluene sulfonyl semicarbazide | 0.3 | added | 50.0 | 322 | 320 | 0.965 to 0.974 | 0.966 to 0.982 | 24.0 |
| " | 0.3 | not added | — | 341 | 434 | 0.969 to 0.982 | 0.950 to 0.985 | 6.0 |
| P, P'-oxybisbenzene-sulfonyl hydrazide | 0.4 | added | 50.0 | 333 | 326 | 0.966 to 0.978 | 0.962 to 0.983 | 24.0 |
| " | 0.4 | not added | — | 335 | 414 | 0.960 to 0.973 | 0.948 to 0.984 | 9.5 |
| N,N'-dinitrosopentamethylene tetramine | 0.2 | added | 50.0 | 320 | 337 | 0.959 to 0.978 | 0.957 to 0.971 | 24.0 |
| " | 0.2 | not added | — | 349 | 440 | 0.960 to 0.983 | 0.944 to 0.980 | 6.5 |

*ADCA is an abbreviation of azodicarbonamide.

As clearly seen from Table 4 above, where N-ethyl acetamide having a solubility parameter of 12.3 which acted as an antiplateous agent was not added to a foamable polypropylene composition containing azodicarbonamide and any other thermally decomposable foaming agent, then the head pressure abnormally rose to more than 400 kg/cm², and a noticeable change took place in the outer diameter of the respective finished insulated electric wires due to the foamable polypropylene compositions being extruded in widely varying amounts. In contrast, addition of N-ethyl acetamide having a solubility parameter of 12.3 enabled the extruder to be operated continuously for long hours under a stable condition.

EXAMPLES 12 AND 13

90 parts by weight of polyethylene-vinyl acetate copolymer powder containing 2 per cent by weight of vinyl acetate, having a density of 0.926 and M.I. of 0.3 and containing about 80 per cent by weight of 100 mesh pass particles of said copolymer, 10 parts by weight of azodicarbonamide and 1.5 parts by weight of 2,4,6-tris (methyl amino) - 1,3,5 triazine (Example 12), or the said first two materials and 1.5 parts by weight of carboxymethyl cellulose (Example 13) were mixed in a Henschel mixer. Each mixture was extruded and pelletized by an extruder in which the cylinder had an inner diameter of 90 mm and L/D was 20 at a lower temperature than the decomposition temperature of azodicarbonamide. One part by weight of the pellets obtained were blended with 14 parts by weight of natural pellets of the above-mentioned polyethylene-vinyl acetate copolymer in a V-shaped blender. The blended mass was charged into the hopper of the insulating extruder in which the cylinder had an inner diameter of 65 mm and L/D was 20, and extruded on an annealed copper wire 0.9 mm in diameter traveling at a speed of 600 m/min so as to finish an electric wire insulated with foamed resin with an outer diameter of 2.2 mm, with the insulation layer expanded at the rate of 25 percent. Immediately after the commencement of extrusion, the extruder had a head pressure of 308 kg/cm$^2$ (Example 12) and 312 kg/cm$^2$ (Example 13) and the finished insulated electric wire had an outer diameter of 2.19 to 2.21 mm (Example 12) and 2.18 to 2.20 mm (Example 13). 48 hours after the initiation of extrusion, the head pressure stood at 310 kg/cm$^2$ (Example 12) and 315 kg/cm$^2$ (Example 13), and the finished insulated electric wire had an outer diameter of 2.18 to 2.20 mm (Example 12) and 2.19 to 2.21 mm (Example 13), providing good quality electric wires insulated with foamed polyethylene-vinyl acetate copolymer without any prominent change in the head pressure and the outer diameter of the finished insulated electric wires. 50 hours after the start of extrusion, the extruder was stopped for cleaning. It was found that there was little residual thermal decomposition product of azodicarbonamide deposited on the parts of the extruder such as the die, crosshead, cylinder barrel and screw.

CONTROL 4

90 parts by weight of polyethylene-vinyl acetate copolymer powder containing 2 per cent by weight of vinyl acetate, having a density of 0.926 and M.I. of 0.3 and containing about 80 per cent by weight of 100 mesh pass particles of said copolymer and 10 parts by weight of azodicarbonamide were mixed in a Henschel mixer. The mixture was extruded and pelletized by the same extruder as used in Example 12 at a lower temperature than the decomposition temperature of the foaming agent. One part by weight of the pellets and 14 parts by weight of natural pellets of the above-mentioned polyethylene-vinyl acetate copolymer were blended in a V-shaped blender. The blended mass was charged into the hopper of the same extruder as used in Example 12 and extruded on an annealed copper wire 0.9 mm in diameter traveling at a speed of 600 m/min so as to finish an electric wire insulated with a foamed resin with an outer diameter of 2.2 mm and an electrostatic capacitance of 120 ± 3 PF/m, with the insulation layer expanded at the rate of 25 percent. Immediately after the commencement of extrusion, the extruder had a head pressure of 305 kg/cm$^2$ and the finished insulated electric wire had an outer diameter of 2.19 to 2.22 mm. 3.5 hours ater the start of extrusion, however, the head pressure excessively rose to 510 kg/cm$^2$ and the finished insulated electric wire presented a prominent change of 2.14 to 2.21 mm in the outer diameter. In view of these undesirable events the extruder was stopped for cleaning. It was found that a grayish white residual thermal decomposition product of azodicarbonamide settle on the parts of the extruder such as the die, crosshead, cylinder barrel and screw.

EXAMPLE 14

100 parts by weight of polypropylene having a density of 0.90 and M.I. of 3.0, 0.4 part by weight of azodicarbonamide and 0.3 part by weight of melamine were blended in a V-shaped blender. The blended mass was charged into the hopper of the extruder in which the cylinder had an inner diameter of 65 mm and L/D was 27. On the other hand, the extruder was supplied each time at the vent with various volatile liquid foaming agents or gases shown in Table 5 below. All the charged materials were fully mixed in the extruder cylinder and extruded on an annealed copper wire 0.65 mm in diameter traveling at a speed of 650 m/min so as to finish electric wires insulated with foamed polypropylene with an outer diameter of 0.97 mm (insulation layer 0.16 mm thick) and an electrostatic capacitance of 250 ± 6 PF/m, with the insulation layer expanded at the rate of 15 percent. Determination was made of changes with time in the head pressure of the extruder and the outer diameter of the respective finished electric wires insulated with the foamed polypropylene, the results being also set forth in Table 5 below.

Table 5

| Foaming agent used with ADCA* | Amount added (g/min) | Melamine added or not | Melamine proportion based on ADCA* (%) | Head pressure (kg/cm$^2$) when extrusion started | Head pressure (kg/cm$^2$) when extrusion ended | Outer diameter of finished insulated electric wire (mm) when extrusion started | Outer diameter of finished insulated electric wire (mm) when extrusion ended | Period of continuous extrusion (hrs) |
|---|---|---|---|---|---|---|---|---|
| Benzene | 0.35 | not added | — | 330 | 445 | 0.956 to 0.983 | 0.946 to 0.982 | 6.5 |
| " | 0.35 | added | 75.0 | 333 | 361 | 0.961 to 0.975 | 0.964 to 0.974 | 24.0 |
| Hexane | 0.37 | not added | — | 319 | 428 | 0.967 to 0.977 | 0.950 to 0.980 | 5.0 |

Table 5 — Continued

| Foaming agent used with ADCA* | Amount added (g/min) | Melamine added or not | Melamine proportion based on ADCA* (%) | Head pressure (kg/cm²) when extrusion started | Head pressure (kg/cm²) when extrusion ended | Outer diameter of finished insulated electric wire (mm) when extrusion started | Outer diameter of finished insulated electric wire (mm) when extrusion ended | Period of continuous extrusion (hrs) |
|---|---|---|---|---|---|---|---|---|
| ″ | 0.37 | added | 75.0 | 318 | 340 | 0.969 to 0.982 | 0.966 to 0.975 | 24.0 |
| n-pentane | 0.31 | not added | — | 317 | 432 | 0.969 to 0.982 | 0.957 to 0.898 | 7.0 |
| ″ | 0.31 | added | 75.0 | 325 | 349 | 0.965 to 0.982 | 0.959 to 0.974 | 24.0 |
| Isopentane | 0.31 | not added | — | 316 | 423 | 0.968 to 0.982 | 0.952 to 0.982 | 6.0 |
| ″ | 0.31 | added | 75.0 | 312 | 337 | 0.966 to 0.976 | 0.968 to 0.985 | 24.0 |
| Petroleum ether | 0.36 | not added | — | 309 | 449 | 0.958 to 0.977 | 0.943 to 0.985 | 5.5 |
| ″ | 0.36 | added | 75.0 | 317 | 352 | 0.955 to 0.975 | 0.960 to 0.978 | 24.0 |
| Monofluoro-trichloro-methane | 0.6 | not added | — | 319 | 418 | 0.963 to 0.978 | 0.960 to 0.980 | 8.5 |
| ″ | 0.6 | added | 75.0 | 322 | 335 | 0.959 to 0.977 | 0.968 to 0.978 | 24.0 |
| Carbon dioxide gas | 0.19 | not added | — | 328 | 450 | 0.968 to 0.980 | 0.954 to 0.989 | 6.0 |
| ″ | 0.19 | added | 75.0 | 325 | 347 | 0.958 to 0.976 | 0.956 to 0.974 | 24.0 |
| Nitrogen gas | 0.13 | not added | — | 324 | 420 | 0.966 to 0.973 | 0.953 to 0.989 | 5.5 |
| ″ | 0.13 | added | 75.0 | 328 | 350 | 0.956 to 0.975 | 0.963 to 0.977 | 24.0 |
| Propane | 0.20 | not added | — | 323 | 435 | 0.966 to 0.979 | 0.953 to 0.986 | 6.0 |
| ″ | 0.20 | added | 75.0 | 318 | 350 | 0.957 to 0.977 | 0.962 to 0.975 | 24.0 |
| Butane | 0.25 | not added | — | 326 | 413 | 0.960 to 0.984 | 0.948 to 0.989 | 5.5 |
| ″ | 0.25 | added | 75.0 | 318 | 347 | 0.958 to 0.973 | 0.964 to 0.984 | 24.0 |
| Dichloro-difluoro-methane | 0.52 | not added | — | 330 | 432 | 0.962 to 0.979 | 0.953 to 0.988 | 9.0 |
| ″ | 0.52 | added | 75.0 | 322 | 340 | 0.964 to 0.983 | 0.960 to 0.983 | 24.0 |

*ADCA is an abbreviation of azodicarbonamide.

As apparent from Table 5 above, where a foaming agent of azodicarbonamide and any of the above listed volatile liquid foaming agents or gaseous materials such as carbon dioxide gas and nitrogen gas were jointly used, omission of an antiplateout agent having a solubility parameter of 12.0 or more caused the head pressure to rise sharply and the resin compositions to be extruded in widely varying amounts with a prominent change in the outer diameter of the finished insulated electric wires. However, addition of melamine having a solubility parameter of 17.0 which acted as an antiplateout agent considerably eliminated the abovementioned difficulties, enabling the extruder to be operated continuously for long hours under a stable condition. Further, observation of the parts of the extruder such as the die, crosshead, cylinder barrel and screw showed that a grayish white residual product presumably originating from the thermal decomposition of azodicarbonamide was deposited in widely varying amounts, depending on the presence or absence of melamine.

EXAMPLE 15

100 parts by weight of polyethylene-vinyl acetate copolymer containing 2 per cent by weight of vinyl acetate and having a density of 0.926 and M.I. of 0.3 and 0.7 part by weight of azodicarbonamide or these two materials with 0.2 part by weight of N-ethyl acetamide or γ-butyrolactone were dry blended in a V-shaped blender. The blended mass was charged into the hopper of the extruder in which the cylinder had an inner diameter of 65 mm and L/D was 20 and extruded on an annealed copper wire 0.9 mm in diameter traveling at a speed of 550 m/min, providing electric wires insulated with foamed polyethylene-vinyl acetate copolymer so as to attain a finished outer diameter of 1.34 mm (an insulation coating 0.22 mm) and an electrostatic capacitance of 250 ± 6 PF/m, with the insulation layer expanded at the rate of 33 percent. Determination was made of changes with time in the head pressure and the outer diameter of the finished electric wires insulated with said copolymer, the results being presented in Table 6 below.

Table 6

| Antiplate-out agent | Added or not | Proportion based on ADCA* (%) | Head pressure (kg/cm²) when extrusion started | Head pressure (kg/cm²) when extrusion ended | Outer diameter of finished insulated electric wire (mm) when extrusion started | Outer diameter of finished insulated electric wire (mm) when extrusion ended | Period of continuous operation (hrs) |
|---|---|---|---|---|---|---|---|
| Not added | — | — | 350 | 446 | 1.329 to 1.357 | 1.311 to 1.369 | 7.0 |
| N-ethyl acetamide | added | 28.6 | 357 | 369 | 1.326 to 1.354 | 1.323 to 1.348 | 48.0 |
| γ-butyrolactone | added | 28.6 | 340 | 385 | 1.331 to 1.365 | 1.320 to 1.363 | 48.0 |

*ADCA is an abbreviation of azodicarbonamide.

As seen from Table 6 above, even when the insulating material consisted of a basic polyolefin-series copolymer composition, addition of an antiplateout agent having a solubility parameter of 12.0 or more presented a prominent effect.

As apparent from reference to the examples and controls, the method of this invention for manufacturing electric wires characterized by using for insulation thereof a foamable polyolefin-series resin composition containing not only azodicarbonamide as a foaming agent but also at least 10 per cent by weight of an antiplateout agent having a solubility parameter of 12.0 or more, is free from such difficulties accompanying the prior art process that even when operated only for several hours, the extruder indicates an abnormally increased head pressure, failing to be operated continuously and that the insulation material was extruded in widely varying amounts with a noticeable change in the outer diameter of a finished insulated electric wire. Therefore, the method of this invention enables good quality electric wires insulated with a foamed polyolefin-series resin composition to be manufactured continuously for as long as scores of hours.

What we claim is:

1. A method for manufacturing electric wires insulated with a foamed polyolefin resin by continuous, stable extrusion wherein a foamable polyolefin resin composition is prepared by mixing a polyolefin resin with a foaming agent comprising azodicarbonamide and between about 10 and 150 percent by weight of at least one material having a solubility parameter of at least 12.0 based on the amount of said azodicarbonamide and extruding it on an electric conductor under conditions in which said azodicarbonamide decomposes, said material having said solubility parameter being selected from the group consisting of polyhydric alcohols having less than eight carbon atoms, ethanol amines having less than six carbon atoms, alkanols having less than three carbon atoms, dimethyl sulfoxide, carboxymethyl cellulose, methyl cellulose, lignin, lignin sulfonic acid, lactones, alkyl acetamides, alkylformamides, phenols, ethylene carbonate, thiourea, succinimide, and compounds containing a 1,3,5-triazine ring expressed by the general formula

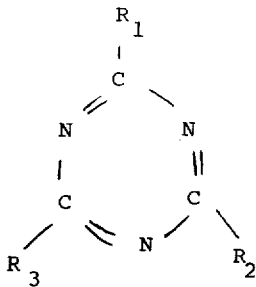

where $R_1$, $R_2$ and $R_3$ are selected from the group consisting of — $NH_2$, —NHOH, —NHCOCH$_3$, —CONH$_2$, —CSNH$_2$, —NHCONH$_2$, NHCH$_3$,

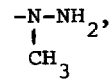

—NHSO$_3$H, —SO$_2$NH$_2$ and NHCHO.

2. A method according to claim 1 wherein the foamable polyolefin-series resin composition is extruded on an electric conductor in a thickness of less than 1.0 mm.

3. A method according to claim 1 wherein 10 to 150 per cent by weight of the material having a solubility parameter of 12.0 or more is added based on the amount of azodicarbonamide used.

4. A method according to claim 1 wherein the polyolefin-series resin is a homopolymer of olefins.

5. A method according to claim 1 wherein the polyolefin-series resin is a copolymer of olefins and vinyl monomers.

6. A method according to claim 1 wherein the polyolefin-series resin is polyethylene.

7. A method according to claim 1 wherein the polyolefin-series resin is polypropylene.

8. A method according to claim 1 wherein the foaming agent consists of azodicarbonamide alone.

9. A method according to claim 1 wherein the foaming agent consists of azodicarbonamide and another foaming agent thermally decomposable at the extrusion temperature of the foamable polyolefin-series resin composition.

10. A method according to claim 1 wherein the foaming agent consists of azodicarbonamide and a volatile liquid foaming agent that turns into gas at the extrusion temperature of the foamable polyolefin-series resin composition.

11. A method according to claim 1 wherein the foaming agent consists of azodicarbonamide and at least one gas.

12. A method according to claim 9 wherein the thermally decomposable foaming agent is at least one selected from the group consisting of p,p'-oxybisbenzenesulfonyl hydrazide, p-toluenesulfonyl semicarbazide, and dinitrosopentamethylene tetramine.

13. A method according to claim 10 wherein the volatile liquid foaming agent is at least one selected from the group consisting of benzene, hexane, isopentane, n-pentane, petroleum ether and monofluorotrichloromethane.

14. A method according to clam 11 wherein the gas used as a foaming agent is at least one selected from the group consisting of carbon dioxide gas, nitrogen gas, propane, butane and dichlorodifluoromethane.

15. A method according to claim 1 wherein the material having a solubility parameter of 12.0 or more is at least one selected from the group consisting of sodium salt of carboxymethyl cellulose, lignin, and melamine.

16. A method according to claim 1 wherein the material having a solubility parameter of 12.0 or more is at least one selected from the group consisting of ethylene glycol, glycerin and triethanolamine.

* * * * *